US011094340B1

(12) United States Patent
Bergerud et al.

(10) Patent No.: US 11,094,340 B1
(45) Date of Patent: Aug. 17, 2021

(54) METHODS OF MANUFACTURING ONE OR MORE SLIDERS, AND RELATED SLIDERS

(71) Applicant: Seagate Technology LLC, Fremont, CA (US)

(72) Inventors: Amy Jo Bergerud, Minneapolis, MN (US); Andrew Joseph Boyne, West Hartford, CT (US); Daniel Richard Buettner, Apple Valley, MN (US); Kurt W. Wierman, Eden Prairie, MN (US); Joel W. Hoehn, Hudson, WI (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/028,676

(22) Filed: Sep. 22, 2020

(51) Int. Cl.
*G11B 5/31* (2006.01)
*G11B 5/48* (2006.01)

(52) U.S. Cl.
CPC .......... *G11B 5/3169* (2013.01); *G11B 5/3116* (2013.01); *G11B 5/4826* (2013.01)

(58) Field of Classification Search
CPC .... G11B 5/3169; G11B 5/3116; G11B 5/4826
USPC ...................... 360/234.1–234.5, 235.1–235.5
See application file for complete search history.

(56) References Cited

U.S. PATENT DOCUMENTS 6,949,004 B1 * 9/2005 Broussalian .......... B24B 37/048 29/603.12
6,956,718 B1 10/2005 Kulkarni et al.
8,310,788 B2 11/2012 Ueda et al.
8,419,905 B2 4/2013 Ueda et al.
2007/0014050 A1 1/2007 Yasui et al.
2007/0042154 A1 2/2007 Hancer et al.
2014/0295740 A1 * 10/2014 Aguirre ................ B24B 37/048 451/54
2019/0381629 A1 12/2019 Rejda et al.

* cited by examiner

*Primary Examiner* — Allen T Cao
(74) *Attorney, Agent, or Firm* — Kagan Binder, PLLC

(57) ABSTRACT

The present disclosure includes methods of using a sacrificial, protective head overcoat during the manufacture of sliders. In some embodiments, the final trailing edge topography of the transducer devices is formed before applying the sacrificial, protective head overcoat. In some embodiments, the final trailing edge topography of the transducer devices is formed after removing the sacrificial, protective head overcoat.

20 Claims, 2 Drawing Sheets

101 141 103 110 151 105 156 111 Kiss Lapping 120
106 109 152 Milling 130
146 144 145 Sacrificial Coating 140
X Z Y
155 Photopatterning 150
145 Ashing 160
Milling 170
185 186 183 181 182 Final Coating 180

METHODS OF MANUFACTURING ONE OR MORE SLIDERS, AND RELATED SLIDERS

BACKGROUND

The present disclosure relates to forming a sacrificial and final protective head overcoat on an air bearing surface of one or more sliders used in hard disk drives.

SUMMARY

The present disclosure includes methods of forming one or more sliders.

In some embodiments, the methods include:

a) providing a substrate comprising one or more sliders;

b) lapping the substrate to form an air bearing surface on the one or more sliders, wherein each slider comprises a transducer region, wherein the transducer region comprises one or more transducer devices;

c) after the lapping, milling the substrate to remove material from each slider in the lapping direction to form a final trailing edge topography in the transducer region;

d) after the milling, applying a sacrificial, protective head overcoat comprising:

i) applying a first, sacrificial protective head overcoat layer to cover each air bearing surface; and ii) applying a second, sacrificial protective head overcoat layer to cover the first, sacrificial protective head overcoat layer, wherein the second, sacrificial protective head overcoat layer has a different composition than the first, sacrificial protective head overcoat layer;

e) after applying the at least second, sacrificial protective head overcoat layer, patterning the air bearing surface of each slider to form an air bearing pattern;

f) after the patterning, removing the second, sacrificial protective head overcoat layer to expose the first, sacrificial protective head overcoat layer;

g) removing the first, sacrificial protective layer to expose the final topography; and h) after removing the first, sacrificial protective layer, applying one or more final protective head overcoat layers to cover each air bearing surface.

In some embodiments, the methods include:

a) providing a substrate comprising one or more sliders;

b) lapping the substrate to form an air bearing surface on the one or more sliders, wherein each slider comprises a transducer region, wherein the transducer region comprises one or more transducer devices;

c) after the lapping, applying a sacrificial protective head overcoat to cover the air bearing surface, wherein the sacrificial protective head overcoat comprises at least one sacrificial protective head overcoat layer;

d) after applying the sacrificial protective head overcoat, patterning the air bearing surface to form an air bearing pattern;

e) after the patterning, removing the sacrificial protective head overcoat;

f) milling the substrate to remove material from each slider in the lapping direction to form a final trailing edge topography in the transducer region; and g) after milling, applying one or more final protective head overcoat layers to cover each air bearing surface.

DETAILED DESCRIPTION

Embodiments of the present disclosure include methods of manufacturing one or more sliders. A slider is used in a magnetic recording apparatus referred to as a hard disk drive (HDD). A slider "flies" above a disk by using air as a lubricant (an "air bearing"). For example, a disk can be placed on a spindle motor that can rotate and a negative pressure air-lubricated bearing slider can be attached at a suspension to correspond to the magnetic disk. The negative pressure air-lubricated bearing slider can be moved by an actuator that pivots so that the slider moves to a desired position on a track of the disk. The disk used as a recording medium has a circular shape and different information can be recorded on each track. In general, to obtain desired information, the slider moves in search of a corresponding track on the disk.

Figure 1:
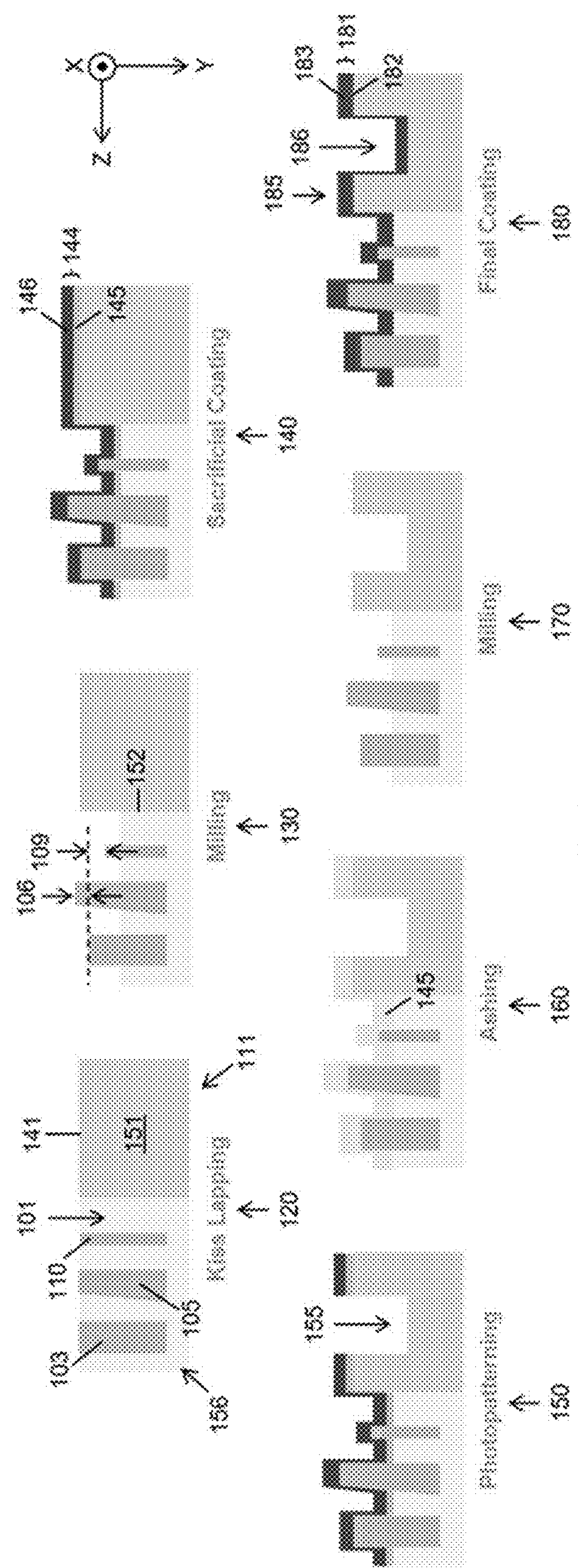
FIG. 1 illustrates a non-limiting embodiment of the present disclosure of a process flow for manufacturing a plurality of sliders.
Figure 2:
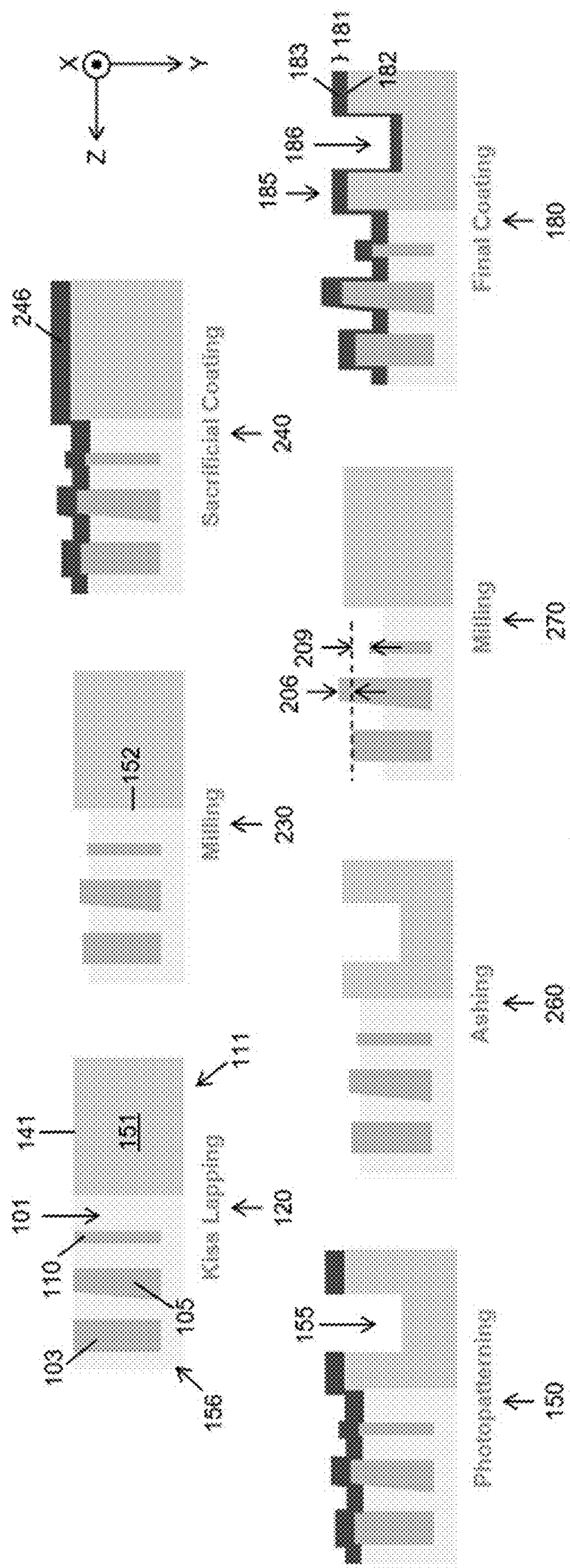
FIG. 2 illustrates another non-limiting embodiment of the present disclosure of a process flow for manufacturing a plurality of sliders.

In more detail, for illustration purposes, an embodiment of manufacturing one or more sliders according to the present disclosure is described with respect to each of FIGS. 1 and 2. Identical reference characters used among each of FIGS. 1 and 2 denote the same features. Accordingly, a description of the same features is not repeated with respect to FIG. 2.

As used herein, the direction along the x-axis (out of the page of each of FIGS. 1 and 2) is referred to as the cross-track axis. The direction along the z-axis is referred to herein as the down-track axis, with reference to trailing edge 156. The direction along the y-axis is referred to herein as the lapping direction (direction of material removal).

FIG. 1 shows a partial cross-section of a slider 111. In the context of the process illustrated in FIG. 1, slider 111 is one of a plurality of sliders adjacent to each other in a continuous row bar (not shown) that extends along the x-axis. Row bars can be cut from a wafer and individual, discrete sliders can be diced from a row bar. In some embodiments, a row bar according to the present disclosure can include at least 30 sliders, at least 60 sliders, or even at least 70 sliders.

As shown in FIG. 1 for the purposes of illustration, slider 111 includes a first region 101 and a second region 151. The first region 101 can be referred to as a transducer region. The transducer region includes one or more transducer devices related to operation of a hard disk drive. Non-limiting examples of such transducer elements include a magnetoresistive reader device (also referred to as a "reader"), an electromagnetic writer device (also referred to as a "writer"), a near field transducer, combinations of these, and the like. For illustration purposes, FIG. 1 shows a writer 105 and a reader 110.

A slider according to the present disclosure can be mostly made out of ceramic material.

As shown in FIG. 1, slider 111 includes what is often referred to as an "AlTiC break" 152 because it divides the first region (including the transducer devices) from the second region 151. The region to the left of break 152 is the transducer region 101. The second region 151 is to the right of break 152 As shown in the partial cross-section of FIG. 1, a relatively small portion of the second region 151 is illustrated.

Sliders can be made of a variety of materials. In some embodiments, the bulk of the material in the second region 151 includes, but is not limited to, alumina titanium-carbide (also referred to as AlTiC). In some embodiments, the bulk of the material in the first region 101, with the exception of many of the electronic features in the transducer region 101, is a ceramic material. A non-limiting example of such a ceramic material is alumina. Elements such as writer 105 are made of magnetic materials such as cobalt-iron (CoFe), nickel-iron (NiFe), and the like.

A non-limiting example of a slider is described in U.S. Pub. No. 2019/0381629 (Rejda et al.), wherein the entirety of said patent publication is incorporated herein by reference.

Rough Lapping

Although not shown in FIG. 1 or 2, manufacturing sliders typically includes a first lapping process referred to as "rough lapping" that forms a first, lapped major surface or "pre-lapped" air bearing surface. Rough lapping can be considered a relatively coarse lapping procedure used to remove relatively more material as compared to subsequent kiss lapping 120 (discussed below). For example, rough lapping can remove up to 10,000 nanometers of material from a row bar in the lapping direction, or even up to 20,000 nanometers of material from a row bar in the lapping direction. In some embodiments, rough lapping can remove from 5,000 to 30,000 nanometers, or even from 10,000 to 20,000 nanometers of material from the major surface of the substrate in the lapping direction.

Kiss Lapping

A method of forming one or more sliders according to the present disclosure includes lapping a substrate to form an air bearing surface on the one or more sliders. Such lapping is referred to as "kiss lapping", which is a final lapping procedure. Kiss lapping can be considered a fine lapping procedure and can be used to remove fractions of material from each slider 111 in a row bar as compared to rough lapping. For example, referring to FIG. 1, kiss lapping can form a lapped major surface 141, which can be referred to as air bearing surface 141. In some embodiments, kiss lapping 120 can remove from 1 to 500 nanometers, from 1 to 300 nanometers, or even from 10 to 50 nanometers of material from the major surface of the substrate in the lapping direction.

Milling

One or more milling (sometimes referred to as "etching") processes can be performed after kiss lapping. Milling can be performed according to the present disclosure at one or more times after kiss lapping and in a manner to remove relatively less material in the lapping direction as compared to kiss lapping. In some embodiments, if desired, a relatively "light" mill or etch can be performed in a manner to clean the air bearing surface prior to applying a sacrificial, protective head overcoat. In some embodiments, milling can form what is referred to as the final trailing edge (TE) topography. Forming the final TE topography can occur before applying a sacrificial, protective head overcoat or after removing a sacrificial, protective head overcoat. In some embodiments, milling to form the final TE topography can involve removing relatively more material in the lapping direction as compared to a light mill.

As used herein, the "final trailing edge topography" refers to the final target protrusion or recession of transducer device features (e.g., the layers of different material that can make up said features of a given device such as a reader, a writer, a near field transducer, etc.) with respect to the final air bearing surface in the lapping direction or the final plane of some other reference feature in the transducer region such as the top plane (indicated by dotted line) of reference feature 103. Also, any given transducer device feature could have a protrusion or recession relative to a given reference point, as desired. For example, in some embodiments a writer may have a protrusion relative to a reference point. And in other embodiments, a writer may have recession relative to a reference point. After kiss lapping, but before etching, the protrusion or recession of transducer device features in the transducer region 101 of a given slider 111 are not at their final target protrusion or recession in the lapping direction.

For illustration purposes, FIG. 1 shows an example of a writer having a protrusion and a reader having a recession. Referring to FIG. 1, before milling 130, the writer 105 and a reader 110 that are near air bearing surface 141 are not at their final target protrusion 106 and recession 109, respectively, relative to the top plane (indicated by dotted line) of reference feature 103. It is noted that final target protrusion 106 of writer 105 can nominally represent multiple features of writer 105 and that an individual feature of writer 105 may have a final protrusion distance in the lapping direction that is different from another individual feature of writer 105, which, as mentioned above, can be defined by a different layer of material. Likewise, final target recession 109 of reader 110 can represent multiple features of reader 110. With respect to final trailing edge topography, milling 130 slider 111 can remove materials from lapped air bearing surface 141 at material-specific rates in the lapping direction until the target protrusion 106 and recession 109, respectively, are reached to form a final topography in the transducer region 101. In some embodiments, milling before applying a sacrificial, protective head overcoat can form a final TE topography by removing up to 50 angstroms of material from a row bar in the lapping direction, or even up to 100 angstroms of material from a row bar in the lapping direction. In some embodiments, milling before applying a sacrificial, protective head overcoat can remove from 10 to 60 angstroms, or even from 30 to 50 angstroms of material from the major surface of the substrate in the lapping direction.

Referring to FIG. 2 as another example, milling 230 slider 111 can remove material from each slider 111 in the lapping direction to clean air bearing surface 141 prior to applying 240 a sacrificial, protective head overcoat, as discussed below. In some embodiments, milling 230 before applying a sacrificial, protective head overcoat to clean air bearing surface 141 can include removing 10 angstroms or less of material from a row bar in the lapping direction, or even 5 angstroms or less of material from a row bar in the lapping direction. In some embodiments, etching 230 before applying a sacrificial, protective head overcoat can remove from 0.1 to 10 angstroms, or even from 0.1 to 5 angstroms of material from the major surface of the substrate in the lapping direction.

Performing a light mill or etch to clean air bearing surface 141 prior to applying 240 a sacrificial, protective head overcoat can advantageously leave an amount of material to help protect the transducer devices when removing the sacrificial, protective head overcoat after patterning. For example, as shown in FIG. 2, unlike milling 130, the writer 105 and a reader 110 that are near air bearing surface 141 are not at their final target protrusion 206 and recession 209, respectively, relative to the top plane (indicated by dotted line) of reference feature 103 after milling 230. The final target protrusion 206 and recession 209 are not formed until after milling 270, thereby forming a final topography in the transducer region 101. In some embodiments, milling after removing a sacrificial, protective head overcoat can form a final TE topography by removing up to 40 angstroms (e.g., from 15 to 45 angstroms) of material from a row bar in the lapping direction, or even up to 70 angstroms of material from a row bar in the lapping direction. In some embodiments, when milling is performed to form the final trailing edge (TE) topography before applying a sacrificial, protective head overcoat milling can remove from 1 to 50 angstroms, 10 to 50 angstroms, from 20 to 50 angstroms, or even from 30 to 40 angstroms of material from the major surface of the substrate in the lapping direction.

Non-limiting examples of milling according to the present disclosure include ion milling and magnetron etching. Conditions can be selected for milling to mill and remove material as described herein. For example, in ion milling, which is a physical etching technique not a "wet-etching" technique, the time period of ion milling, ion beam energy, source of ions, process pressure, substrate temperature, and incident ion beam angle can be selected to achieve a desired rate, selectivity (e.g., selective with respect to alumina and devices (e.g., metals such as nickel-iron)), and depth of milling (removal of material). The source of ions can be derived from inert gas (e.g., argon and the like) or inert gas mixed with reactive gas (e.g. argon and oxygen). In some embodiments, ion beam energy can be selected to be 500 eV or less, or even 100 eV or less. For example, the ion beam energy can be selected to be in the range from 50 to 300 eV. Process pressure is typically operated at a vacuum (e.g., from $1\times10^{-4}$ Torr to $1\times10^{-3}$ Torr). An example of ion milling is described in U.S. Pub. No. 2007/0014050 (Yasui et al.), wherein the entirety of said patent document is incorporated herein by reference.

Apply Sacrificial, Protective Head Overcoat

Prior to patterning, a sacrificial, protective head overcoat can be applied to cover at least a portion of (e.g., the entire) the air bearing surface of each slider. As used herein, a "sacrificial, protective head overcoat" refers to one or more layers of the same or different material having a thickness in the lapping direction, where the materials and thicknesses are selected to protect at least the one or more transducer devices in the transducer region 101 from physical and/or chemical attack during manufacture of a slider, e.g., during photopatterning (e.g., milling) of the first region 101 and second region 151. As discussed below, at least a portion (e.g., in some embodiments substantially all) of the sacrificial, protective head overcoat will be removed after photopatterning and before slider manufacture is complete so that a final protective head overcoat can be applied to the entire air bearing surface of each slider. In some embodiments, a sacrificial, protective head overcoat can have a different thickness as compared to a final protective head overcoat, for example, due to the different environments they are exposed to (manufacturing versus drive operation, respectively). For example, a sacrificial, protective head overcoat could be relatively less thick or relatively more thick, as desired, relative to a final protective head overcoat. The thickness can determine whether a given protective overcoat is relatively less or more robust (e.g., mechanically and/or chemically).

As mentioned above, sacrificial, protective head overcoat can include one or more discrete layers. A sacrificial, protective head overcoat layer can be made out of a variety materials, which can be selected based on one or more factors such as durability at least through the photopatterning portion of slider manufacture to protect the one or more transducer devices in the transducer region 101 from physical and/or chemical attack; adheres well to alumina and AlTiC; compatibility with materials in the photopatterning process (e.g., adheres well to photoresist); and being able to be removed after photopatterning without damaging the transducer devices to an undue degree; combinations of these; and the like.

In some embodiments, a sacrificial, protective head overcoat layer includes a material chosen from diamond-like carbon (DLC), silicon dioxide, and combinations thereof. With respect to DLC, DLC can be applied to an air bearing surface using a variety of techniques. A non-limiting example of applying DLC includes vacuum deposition (i.e. physical vapor deposition and/or chemical vapor deposition). Non-limiting examples of such vacuum deposition processes include methane-based chemical vapor deposition; acetylene-based chemical vapor deposition; pulsed, filtered, cathodic arc physical vapor deposition; and combinations thereof. Each deposition technique can produce a DLC structure and composition that is different from a DLC structure and composition deposited via a different technique (e.g., different sp2 and sp3 content, and hydrogen content). In some embodiments, a sacrificial protective head overcoat layer such as DLC or silicon dioxide can have a thickness from 10 to 35 angstroms, from 12 to 30 angstroms, from 15 to 30 angstroms, or even from 20 to 30 angstroms.

In some embodiments, a sacrificial, protective head overcoat can include one or more adhesion layers as another sacrificial, protective head overcoat layer between the air bearing surface and one or more overlying sacrificial, protective head overcoat layers to help bond the overlying sacrificial, protective head overcoat layer to the air bearing surface. An adhesion layer can be a material that adheres to dissimilar materials of the air bearing surface (e.g., alumina and AlTiC) and transducer devices (e.g., iron cobalt and nickel iron) and the overlying sacrificial, protective head overcoat layer (e.g., DLC). In some embodiments, an adhesion layer includes at least one material that can form an amorphous oxide when exposed to oxygen (e.g., is self-passivating when exposed to oxygen plasma) during removal of the overlying sacrificial, protective head overcoat layer. In some embodiments, self-passivating amorphous oxide can be uniformly removed so as to not damage underlying transducer devices in a final trailing edge topography. Non-limiting examples of material that can form an amorphous oxide include material chosen from silicon, nickel, chromium, titanium, tungsten, niobium, tantalum, hafnium, yttrium, and combinations thereof. In some embodiments, the adhesion layer can be present as an oxide, carbide, and/or nitride such as alumina, silicon nitride, silica, titanium carbide, metal oxide, and combinations thereof, prior to applying an overlying sacrificial, protective head overcoat layer.

In some embodiments, one or more adhesion layers can each have a thickness from 5 to 35 angstroms, from 5 to 30 angstroms, from 8 to 30 angstroms, or even from 10 to 30 angstroms.

In one embodiment, as shown in FIG. 1, applying 140 a sacrificial, protective head overcoat involves forming a sacrificial, protective head overcoat 144 that includes two layers 145 and 146. In the embodiment illustrated by FIG. 1, each layer 145 and 146 extends across the entire air bearing surface 141 and layer 145 has a different composition than layer 146. Layer 145 is an adhesion layer 145 that is applied to the transducer region 101 and the second region 151 to improve the adhesion of an overlying sacrificial, protective head overcoat layer 146 such as DLC to the air bearing surface 141 (e.g., alumina and AlTiC). Because milling 130 slider 111 formed the final TE topography in the transducer region 101, as discussed above, adhesion layer 145 can be made of a material that forms an amorphous metal oxide when exposed to oxygen during removal of the overlying sacrificial, protective head overcoat layer 146 (discussed below) so as to help protect the underlying transducer devices in a final trailing edge topography.

In some embodiments, an adhesion layer can be avoided if desired. For example, because a sacrificial, protective head overcoat is removed after photopatterning, any tendency for a sacrificial, protective head overcoat layer such as DLC to separate from the air bearing surface during this relatively short time period during manufacture (as compared to its service life in a hard disk drive) may be relatively much less such that an adhesion layer may be avoided if desired.

An embodiment that does not include an adhesion layer in the sacrificial, protective head overcoat is illustrated in FIG. 2. As shown in FIG. 2, applying 240 a sacrificial, protective head overcoat involves forming a sacrificial, protective head overcoat 246 that is a single layer of, e.g., DLC. In the embodiment illustrated by FIG. 2, layer 246 extends across the entire air bearing surface 141. Because milling 230 slider 111 can clean air bearing surface 141 without forming the final TE topography in the transducer region 101, as discussed above, stock material to be removed during milling 270 (discussed below) may provide at least some protection for underlying transducer devices when removing the sacrificial, protective head overcoat 246 (discussed below).

Photopatterning

After applying a sacrificial, protective head overcoat, the air bearing surface can be patterned 150 to form a photopatterned major surface 155 having an air bearing pattern. Photopatterning can include techniques such as photolithography (e.g., photoresist application, exposure, bake, development, and strip) and ion milling. For example, as illustrated in FIG. 1, at least a portion of the air bearing surface 141 is patterned, e.g., via ion milling to remove material at one or more locations on the air bearing surface 141 in both the transducer region 101 and second region 151 to form a patterned major surface 155 having an air bearing pattern. For illustrations purposes, FIG. 1 shows patterning air bearing surface 141 at a location in the second region 151 by, e.g., removing material by a depth to form at least a portion of the air bearing pattern that will ultimately be present in air bearing surface 141. In some embodiments, patterning can remove material (e.g., alumina and/or AlTiC) in the lapping direction in the range from 100 nanometers to 2 micrometers.

In some embodiments, as discussed below, when photopatterning 150 is complete, remaining sacrificial, protective head overcoat can be removed followed by application of a new, final protective head overcoat to the entire air bearing surface. By first temporarily using a sacrificial, protective head overcoat according to the present disclosure, a quality, full surface protective head overcoat can be subsequently applied to the head so that there are no areas of alumina and/or AlTiC that are left exposed on the air bearing surface. In contrast, if a process was used where a final protective head overcoat was applied only prior to patterning instead of using a sacrificial, protective head overcoat according to the present disclosure, areas of exposed alumina and/or AlTiC would remain and the slider would lack a frill surface protective head overcoat, which can cause surface potential differences across the air bearing surface and attract contamination such as lubrication, dust and the like.

Removing Sacrificial, Protective Head Overcoat

After the photopatterning, at least a portion of remaining sacrificial, protective head overcoat can be removed. In some embodiments, substantially all of the sacrificial, protective head overcoat can be removed to expose the underlying surface that was present prior to applying the sacrificial, protective head overcoat so that a fresh, final protective head overcoat can be applied to the entire air bearing surface. Removing the sacrificial, protective head overcoat can include one or more removal techniques depending on, e.g., how many sacrificial, protective head overcoat layers are present and/or their compositional make-up.

Non-limiting examples of techniques for removing the sacrificial, protective head overcoat include physical techniques, chemical techniques and combinations thereof.

A non-limiting example of a physical technique according to the present disclosure includes ion milling. In some embodiments, ion milling is desirable for removing at least part of an adhesion layer that is part of the sacrificial, protective head overcoat such as layer 145. As shown in FIG. 1, substantially all of the adhesion layer 145 is removed to expose the underlying surface that was present prior to applying the sacrificial, protective head overcoat. It is desirable to remove the adhesion layer 145 in a manner that avoids undue mixing with the underlying transducer region 101 while ion milling so as to avoid undue damage to one or more transducer features in the final TE topography. In some embodiments, if desired, only a portion of the adhesion layer could be removed while leaving a residual thickness of the adhesion layer to help further protect the final TE topography that was formed in the embodiment of FIG. 1 prior to applying the sacrificial, protective head overcoat. In some embodiments, at least a portion of an adhesion layer can be removed in a manner such that a residual thickness of adhesion layer remains. For example, a residual thickness of adhesion layer can be from 0.5 to 10 angstroms, from 1 to 5 angstroms, from 2 to 4 angstroms, or even from 0.5 to 2 angstroms. It is noted that there may be some mixing between adjacent layers at the interface between adhesion layer 145 and the underlying transducer region 101 and the second region 151.

Conditions can be selected for ion milling to remove the adhesion layer as described herein. For example, the time period of ion milling, the ion beam energy, the source of ions, process pressure, substrate temperature, and incident ion beam angle can be selected to achieve a desired rate, depth of milling, and undue mixing with and/or damage to the underlying transducer region 101. The source of ions can be derived from inert gas (e.g., argon and the like) or inert gas mixed with reactive gas (e.g. argon and oxygen). In some embodiments, ion beam energy can be selected to be 500 eV or less, or even 100 eV or less. For example, the ion beam energy can be selected to be in the range from 50 to 300 eV. Process pressure is typically operated at a vacuum (e.g., from $1\times10^{-4}$ Torr to $1\times10^{-3}$ Torr).

Non-limiting examples of chemical techniques according to the present disclosure include reactive ion etching (RIE) and plasma ashing. RIE is a dry etching process that uses chemically reactive plasma to remove material deposited on a substrate. The plasma is generated under low pressure such as a vacuum (e.g., from $1\times10^{-3}$ Torr to 1 Torr) by an electromagnetic field. High-energy ions from the plasma attack the substrate surface and react with it.

In some embodiments, plasma ashing is desirable for removing a DLC layer that is part of the sacrificial, protective head overcoat such as layer 146 or layer 246. Conditions can be selected for plasma ashing to remove a DLC layer as described herein. For example, the plasma source, RF power, temperature of the DLC layer, and pressure can be selected to achieve a desired rate of ashing. The plasma source can be a monatomic species (e.g., oxygen, fluorine and the like) that reacts with the DLC to form volatile compounds, which can be removed via a vacuum pump. A plasma source such as monatomic oxygen can be generated by exposing oxygen gas at a low pressure (a vacuum) and radio frequency power to ionize the oxygen gas into monatomic oxygen plasma. When using oxygen plasma ashing to remove a sacrificial, protective head overcoat layer, it can be desirable to use it in a manner that avoids oxidizing magnetic materials such as cobalt-iron (CoFe), nickel-iron (NiFe), and the like of transducer devices to an undue degree.

Referring to FIG. 1, sacrificial, protective head overcoat layer 146 can be made of DLC, which can be removed via, for example, a plasma ashing process 160 such as oxygen plasma ashing. While removing layer 146 via oxygen plasma ashing, the layer 145 can be oxidized into an oxide, e.g., silicon metal to silicon oxide. Because silicon oxide is not removed via oxygen plasma ashing, the layer 145 can function as a "hard stop" to protect the underlying transducer devices that have been formed as part of the final trailing edge topography discussed above. Then, ion milling 170 can be used to remove the silicon dioxide layer 145. Advantageously, ion milling can be controlled to remove silicon dioxide is a relatively uniform manner. The entire layer 145 can be uniformly removed by removing it at a constant etch-rate that is known, offering more control of the mill depth and preventing undue milling of the underlying final TE topography. Because layer 145 has a different composition than layer 146 and is removed via a different technique, layer 145 may be removed in a separate tool than the tool for removing layer 146. In some embodiments, avoiding an adhesion layer can advantageously permit the entire sacrificial, protective head overcoat to be removed via a single technique in a single tool.

Similar to layer 146, sacrificial, protective head overcoat layer 246 can be made of diamond-like carbon (DLC), silicon dioxide, and combinations thereof. In some embodiments, layer 246 is made of DLC, which can be removed via a plasma ashing process 260 such as oxygen plasma ashing. Because the final trailing edge topography was not previously formed, there is less of a concern of exposing underlying transducer devices to oxygen plasma conditions. As explained above, the embodiment of FIG. 2 includes milling 270 after removing 260 sacrificial, protective head overcoat 246 to form the final TE topography. Milling 270 slider 111 can remove materials at material-specific rates in the lapping direction until the target protrusion 206 and recession 209, respectively, are reached to form a final topography in the transducer region 101. In some embodiments, milling 270 can remove surface material that may have been damaged by the sacrificial, protective head overcoat removal process.

Apply Final Protective Head Overcoat

After removing the sacrificial, protective head overcoat, a final protective head overcoat can be applied 180. Optionally, as discussed above, one or more additional process steps (such as milling 270) can be performed between removing the sacrificial, protective head overcoat, and applying the final protective head overcoat.

The materials, techniques, and one or more optional adhesion layers discussed above with respect to the sacrificial, protective head overcoat that can be used for the final protective head overcoat are not repeated here. One consideration that may be different between selecting a sacrificial, protective head overcoat and a final protective head overcoat is the different context of each. As discussed above, the sacrificial, protective head overcoat is selected to protect the air bearing surface for a limited time during manufacture whereas a final protective head overcoat is selected to protect the air bearing surface during hard disk drive operation for the life of the drive. Also, the final protective head overcoat functions as the tribological interface between the head and the disk so that is an additional consideration. In some embodiments, the thickness of the final protective head overcoat can be more of a consideration than the thickness of a sacrificial, protective head overcoat because of the operational interactions that are considered for the final protective head overcoat. In this way, one or more parameter windows for a final protective head overcoat can be considered more restrictive as compared to a sacrificial, protective head overcoat.

Non-limiting examples of applying a final protective head overcoat is illustrated in each of FIGS. 1 and 2. Referring to FIG. 1, after removing 170 the first, sacrificial protective layer 145, a final protective head overcoat 181 is applied to cover the entire air bearing surface of each slider 111. Referring to FIG. 2, after milling 270 a final protective head overcoat 181 is applied to cover the entire air bearing surface of each slider 111. The final protective head overcoat 181 can include one or more final protective head overcoat layers. In some embodiments, as shown in FIG. 1, final protective head overcoat 181 includes a first protective head overcoat layer 182 underlying a second protective head overcoat layer 183. In some embodiments, the first protective head overcoat layer 182 can be an adhesion layer to help bond an overlying protective head overcoat layer to the air bearing surface. An adhesion layer 182 can be a material that adheres to dissimilar materials of the air bearing surface (e.g., alumina and AlTiC) and transducer devices (e.g., iron cobalt and nickel iron) and the protective head overcoat layer (e.g., DLC). An adhesion layer 182 of the final protective head overcoat can be made of a material such as amorphous silicon, amorphous carbides, amorphous nitrides, amorphous oxides, etc. It is noted that adhesion layer 182 can be completely formed during stage 180. Alternatively, as mentioned above, at least part of (e.g., substantially all of) adhesion layer 182 may be residual adhesion layer that is left over after milling 170 in the context shown in FIG. 1 when a final TE topography is formed prior to applying the sacrificial, protective head overcoat. A first protective head overcoat layer (e.g., adhesion layer) can have a thickness of between 1 and 8 angstroms. In some embodiments, the second protective head overcoat layer 183 can be made of diamond-like carbon having a thickness from 10 to 20 angstroms.

Final protective head overcoats, including adhesion layers, are described in U.S. Publication No. 2007/0042154 (Hancer et al.), wherein the entirety of said patent publication is incorporated herein by reference.

As mentioned, the final protective head overcoat layer extends across the entire exterior of the air bearing surface 141. A final protective head overcoat layer can protect at least transducer devices in first region 101 of the air bearing surface 141 from damage and/or contamination (e.g., particle contamination and/or chemical contamination). In addition, by coating the entire exterior surface of the air bearing surface 141 with a final protective head overcoat instead of leaving AlTiC exposed in the milled surfaces, the exterior surface of air bearing surface 141 can have a more uniform surface potential (smaller surface potential difference between surfaces in the lapped region 185 and surfaces in the milled region 186), which, without being bound by theory, is believed to facilitate reduction in contamination such as particle contamination.

In some embodiments, the surfaces in the lapped region 185 and the milled region 186 that have a final protective head overcoat 181 can have a surface potential difference of +/−50 milliVolts or less, +/−20 milliVolts or less, +/−10 milliVolts or less, +/−5 milliVolts or less, or even +/−1 milliVolt or less as measured according to Kelvin Probe Force Microcopy (KPFM).

After applying the final protective head overcoat 181, a row bar of sliders 111 can be processed according to one or more optional processes. For example, the row bar can be diced into individual, discrete sliders 111.

As another example, at least the final protective head overcoat 181 of each slider can be treated either before or after dicing to modify the properties of the protective head overcoat. For example, the protective head overcoat can be treated to improve its contamination resistance properties. In some embodiments, the protective head overcoats 181 or can be modified to alter its surface energy (e.g., lower its surface energy). Non-limiting examples of such modifications include applying one or more self-assembled monolayers ("SAMs"), applying one or more surfactants, applying other chemical/polymeric coatings or treatments, combinations of these and the like. For example, protective head overcoat 181 can be treated with a fluorine containing plasma to form a fluorinated protective head overcoat. This can include ex-situ applications (e.g., plasma or ion beam etching of a protective head overcoat after deposition) or in-situ applications (e.g., incorporating fluorine chemistry during vacuum deposition of protective head overcoat). Protecting transducer elements in the first region 101 from undue damage is a consideration when performing fluorination of a protective head overcoat in-situ.

What is claimed is:

1. A method of forming one or more sliders, wherein the method comprises:

a) providing a substrate comprising one or more sliders;

b) lapping the substrate to form an air bearing surface on the one or more sliders, wherein each slider comprises a transducer region, wherein the transducer region comprises one or more transducer devices;

c) after the lapping, milling the substrate to remove material from each slider in the lapping direction to form a final trailing edge topography in the transducer region;

d) after the milling, applying a sacrificial, protective head overcoat comprising:

i) applying a first, sacrificial protective head overcoat layer to cover each air bearing surface; and ii) applying a second, sacrificial protective head overcoat layer to cover the first, sacrificial protective head overcoat layer, wherein the second, sacrificial protective head overcoat layer has a different composition than the first, sacrificial protective head overcoat layer;

e) after applying the at least second, sacrificial protective head overcoat layer, patterning the air bearing surface of each slider to form an air bearing pattern;

f) after the patterning, removing the second, sacrificial protective head overcoat layer to expose the first, sacrificial protective head overcoat layer;

g) removing the first, sacrificial protective layer to expose the final topography; and h) after removing the first, sacrificial protective layer, applying one or more final protective head overcoat layers to cover each air bearing surface.

2. The method of claim 1, wherein the one or more transducer devices are chosen from at least one electromagnetic writer device, at least one magnetoresistive reader device, and combinations thereof.

3. The method of claim 1, wherein the milling removes material at a depth in the lapping direction from 10 to 60 angstroms.

4. The method of claim 1, wherein the first, sacrificial protective head overcoat layer has a thickness from 5 to 30 angstroms.

5. The method of claim 1, wherein the first, sacrificial protective head overcoat layer comprises a material that forms an amorphous oxide when exposed to oxygen.

6. The method of claim 5, wherein the material is chosen from silicon, nickel, chromium, titanium, tungsten, niobium, tantalum, hafnium, yttrium, and combinations thereof.

7. The method of claim 1, wherein the second, sacrificial protective head overcoat layer has a thickness from 10 to 30 angstroms.

8. The method of claim 1, wherein the second, sacrificial protective head overcoat layer comprises diamond-like carbon.

9. The method of claim 1, wherein removing the second, sacrificial protective head overcoat layer comprises exposing the second, sacrificial protective head overcoat layer to oxygen plasma under conditions to remove the second, sacrificial protective head overcoat layer.

10. The method of claim 1, wherein exposing the second, sacrificial protective head overcoat layer to oxygen plasma oxidizes at least a portion of the first, sacrificial protective head overcoat layer.

11. The method of claim 10, wherein removing the first, sacrificial protective layer comprises ion milling the first, sacrificial protective head overcoat layer to remove the first, sacrificial protective head overcoat layer.

12. The method of claim 1, wherein the one or more final protective head overcoat layers comprise:

a) a first protective head overcoat layer comprising a material chosen from amorphous silicon, an amorphous carbide, an amorphous nitride, an amorphous oxide, and combinations thereof, wherein the first protective head overcoat layer has a thickness of 6 angstroms or less; and b) a second protective head overcoat layer comprising diamond-like carbon, wherein the second protective head overcoat layer has thickness from 10 to 20 angstroms, and wherein the first protective head overcoat layer underlies the second protective head overcoat layer.

13. A method of forming one or more sliders, wherein the method comprises:

a) providing a substrate comprising one or more sliders;

b) lapping the substrate to form an air bearing surface on the one or more sliders, wherein each slider comprises a transducer region, wherein the transducer region comprises one or more transducer devices;

c) after the lapping, applying a sacrificial protective head overcoat to cover the air bearing surface, wherein the sacrificial protective head overcoat comprises at least one sacrificial protective head overcoat layer;

d) after applying the sacrificial protective head overcoat, patterning the air bearing surface to form an air bearing pattern;

e) after the patterning, removing the sacrificial protective head overcoat;

f) milling the substrate to remove material from each slider in the lapping direction to form a final trailing edge topography in the transducer region; and g) after milling, applying one or more final protective head overcoat layers to cover each air bearing surface.

14. The method of claim 13, wherein the one or more transducer devices are chosen from at least one electromagnetic writer device, at least one magnetoresistive reader device, and combinations thereof.

15. The method of claim 13, further comprising, after the lapping and prior to the applying the sacrificial protective head overcoat, milling the substrate to remove material from each slider in the lapping direction, wherein the milling removes material at a depth in the lapping direction of 15 angstroms or less.

16. The method of claim 13, wherein the at least one sacrificial protective head overcoat layer has a thickness from 5 to 30 angstroms.

17. The method of claim 16, wherein the at least one sacrificial protective head overcoat layer comprises diamond-like carbon or silicon dioxide.

18. The method of claim 17, wherein removing the at least one sacrificial protective head overcoat layer comprises exposing the at least one sacrificial protective head overcoat layer to oxygen plasma under conditions to remove the at least one sacrificial protective head overcoat layer.

19. The method of claim 13, wherein the milling removes material at a depth in the lapping direction from 10 to 50 angstroms.

20. The method of claim 13, wherein the one or more final protective head overcoat layers comprises:

a) a first protective head overcoat layer comprising a material chosen from an amorphous silicon, an amorphous carbide, an amorphous nitride, an amorphous oxide, and combinations thereof, wherein the first protective head overcoat layer has a thickness of 6 angstroms or less; and b) a second protective head overcoat layer comprising diamond-like carbon, wherein the second protective head overcoat layer has thickness from 10 to 20 angstroms, and wherein the first protective head overcoat layer underlies the second protective head overcoat layer.

* * * * *